United States Patent [19]
Taniuchi et al.

[11] Patent Number: 5,315,416
[45] Date of Patent: May 24, 1994

[54] MONO-COLOR EDITING METHOD FOR COLOR PICTURE IMAGE RECORDING

[75] Inventors: Kazuman Taniuchi; Katuyuki Kouno; Hiroshi Sekine, all of Kanagawa, Japan

[73] Assignee: Fuji Xerox Co., Ltd., Tokyo, Japan

[21] Appl. No.: 882,011

[22] Filed: May 13, 1992

[30] Foreign Application Priority Data

May 14, 1991 [JP] Japan .................................. 3-109243

[51] Int. Cl.⁵ .......................... G03F 3/00; G03F 15/00
[52] U.S. Cl. .................................... 358/537; 358/452; 358/520
[58] Field of Search ...................... 358/310, 311, 21 R, 358/29, 30, 31, 448, 452, 500, 501, 518, 520, 534, 535, 537

[56] References Cited
U.S. PATENT DOCUMENTS

| | | | |
|---|---|---|---|
| 4,282,547 | 8/1981 | Morishita | 358/44 |
| 4,996,591 | 2/1991 | Kadowaki et al. | 358/80 |
| 5,119,180 | 6/1992 | Okamoto | 358/41 |
| 5,187,570 | 2/1993 | Hibi et al. | 358/80 |
| 5,233,434 | 8/1993 | Furuki et al. | 358/310 |

*Primary Examiner*—Bentsu Ro
*Attorney, Agent, or Firm*—Finnegan, Henderson, Farabow, Garrett & Dunner

[57] ABSTRACT

A matrix unit receives a luminance signal L* for a uniform color space and two color difference signals a* and b*. Then, when a control signal has given instructions for a mono-color editing operation, the matrix means outputs only the luminance signal L* out of the picture image data fed into it, and, when a control signal is given otherwise, the matrix means generates and outputs toner color signals for the colors Y, M, C, and K. A multiplying unit multiplies with a prescribed coefficient the picture image data which are output from the matrix unit, and the multiplying unit multiplies the picture image data with a coefficient for permitting the toner signal output from the matrix unit to pass through in case the control signal has not given any instructions for any mono-color editing operation, and multiplies the input luminance signal L* with four coefficients corresponding to the color as instructed by the control signal and generate four toner color signals for Y, M, C, and K. The coefficients have the data form representing the coverage of the toner colors, Y, M, C, and K.

9 Claims, 14 Drawing Sheets

FIG. 1A
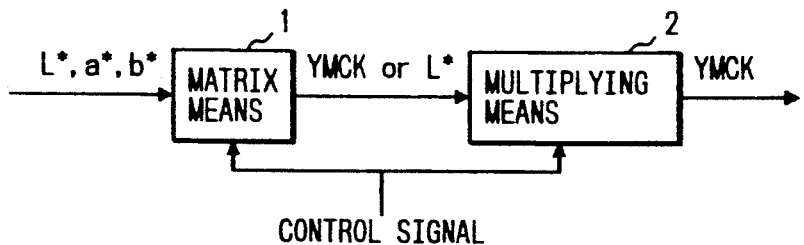
FIG. 1B
| MONO-COLOR | COEFFICIENT |
|---|---|
| THROUGH | $KY_0, YM_0, KC_0, KK_0$ |
| COLOR 1 | $KY_1, YM_1, KC_1, KK_1$ |
| COLOR 2 | $KY_2, YM_2, KC_2, KK_2$ |
| ⋮ | ⋮ |
| COLOR n | $KY_n, YM_n, KC_n, KK_n$ |
FIG. 1D
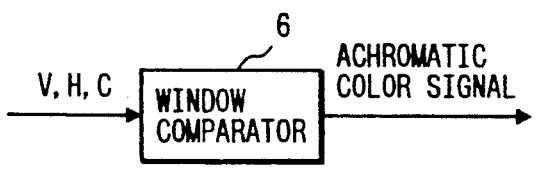
FIG. 1C
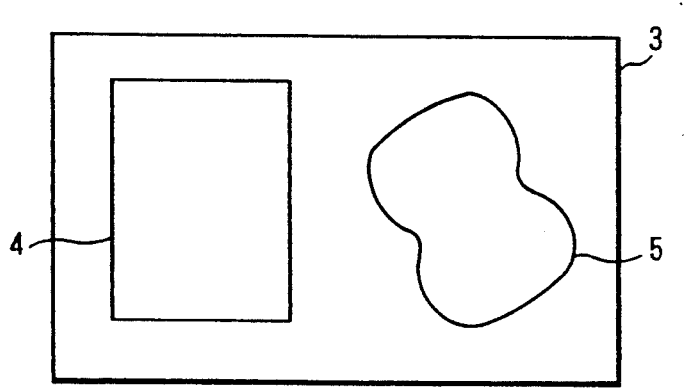

FIG. 8

| INPUT | | | OUTPUT | | | |
|---|---|---|---|---|---|---|
| LOGIC | flag | V>CP | psel | zt | sp | |
| 0 0 0 | — | — | 0 | 1 | 0 | THROUGH |
| 0 0 1 | 0 | — | 0 | 0 | 0 | CHARACTER COLORATION |
| 0 0 1 | 1 | — | 1 | 1 | 0 | |
| 0 1 0 | 0 | — | 1 | 1 | 0 | COLOR RELIEF CHARACTER |
| 0 1 0 | 1 | — | 1 | 1 | 1 | |
| 0 1 1 | — | 0 | 1 | 1 | 0 | NOT USED |
| 0 1 1 | — | 1 | 0 | 1 | 0 | |
| 1 0 0 | — | — | 1 | 1 | 0 | PAINT |
| 1 0 1 | 0 | — | 0 | 1 | 0 | CHARACTER SYNTHESIS |
| 1 0 1 | 1 | — | 1 | 1 | 0 | |
| 1 1 0 | 0 | — | 1 | 1 | 0 | COLORATION |
| 1 1 0 | 1 | — | 0 | 1 | 0 | |
| 1 1 1 | 0 | 0 | 0 | 1 | 0 | NOT USED |
| 1 1 1 | 0 | 1 | 0 | 1 | 0 | |
| 1 1 1 | 1 | 0 | 0 | 1 | 0 | |
| 1 1 1 | 1 | 1 | 0 | 1 | 0 | |

| LOGIC 2,1,0 | function | OUTPUT | | OPERATION |
|---|---|---|---|---|
| | | f.g. | b.g. | |
| 0,0,0 | THROUGH | video | |  |
| 0,0,1 | CHARACTER COLORATION | color_palt | 0 (BLANKING) |  |
| 0,1,0 | COLOR RELIEF CHARACTER | fore_palt | color_palt |  |
| 1,0,0 | PAINT | color_palt | |  |
| 1,0,1 | CHARACTER SYNTHESIS | color_palt | video |  |
| 1,1,0 | COLORATION | video | color_palt |  |

FIG. 10

| TSEL | MEANING | OPERATION |
|---|---|---|
| 0 | ANNOTATION | DETERMINED AS f.g. WHEN V>TH |
| 1 | CHARACTER SYNTHESIS | DETERMINED AS f.g. WHEN TEX (CHARACTER MEMORY READ VALUE)=1 |

FIG. 11

| MUL | | | | MULTIPLIER COEFFICIENT |
|---|---|---|---|---|
| 3 | 2 | 1 | 0 | |
| 0 | 0 | 0 | 0 | THROUGH |
| 0 | 0 | 0 | 1 | A |
| 0 | 0 | 1 | 0 | B |
| 0 | 0 | 1 | 1 | C |
| 0 | 1 | 0 | 0 | D |
| 0 | 1 | 0 | 1 | E |
| 0 | 1 | 1 | 0 | F |
| 0 | 1 | 1 | 1 | G |
| 1 | 0 | 0 | 0 | H |
| 1 | 0 | 0 | 1 | I |
| 1 | 0 | 1 | 0 | J |
| 1 | 0 | 1 | 1 | K |
| 1 | 1 | 0 | 0 | L |
| 1 | 1 | 0 | 1 | M |
| 1 | 1 | 1 | 0 | N |
| 1 | 1 | 1 | 1 | O |

FIG. 12

| CCSEL | | | OPERATION OF COLOR CONVERTING CIRCUIT | | | |
|---|---|---|---|---|---|---|
| 2 | 1 | 0 | D | C | B | A |
| 0 | 0 | 0 |   |   |   |   |
| 0 | 0 | 1 |   |   |   | O |
| 0 | 1 | 0 |   |   | O |   |
| 0 | 1 | 1 |   | O |   |   |
| 1 | 0 | 0 | O |   |   |   |
| 1 | 0 | 1 |   |   | O | O |
| 1 | 1 | 0 |   | O | O | O |
| 1 | 1 | 1 | O | O | O | O |

FIG. 13

| NEG | MEANING |
|---|---|
| 0 | ORDINARY COPYING |
| 1 | NEGATIVE-POSITIVE REVERSAL |

FIG. 14A
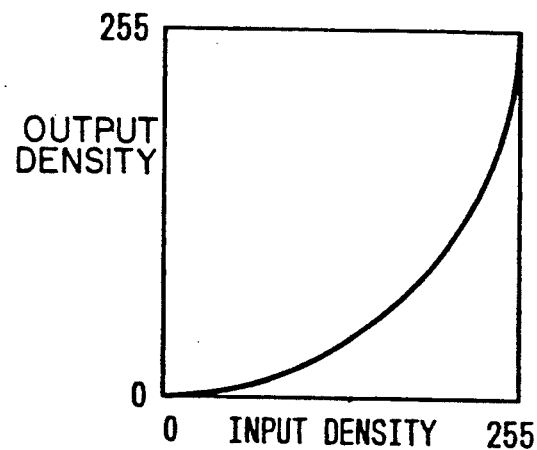
FIG. 14B
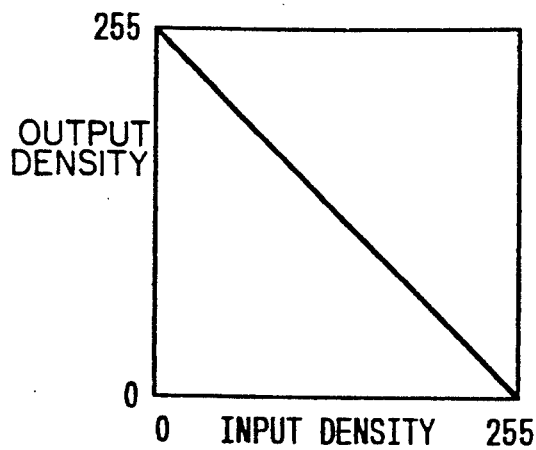
FIG. 15
| TYPE | | TYPE OF ORIGINAL SHEET |
|---|---|---|
| 1 | 0 | |
| 0 | 0 | STANDARD |
| 0 | 1 | CHARACTER |
| 1 | 0 | PHOTOGRAPH |
| 1 | 1 | MAP |
FIG. 16
| FUL | MON | MODE OF ORIGINAL SHEET |
|---|---|---|
| 0 | 0 | THREE COLORS |
| 0 | 1 | MONO-COLOR, B/W |
| 1 | 0 | FOUR COLORS |
| 1 | 1 | FOUR COLORS |

| ESS | | MEANING |
|---|---|---|
| 1 | 0 | |
| 0 | 0 | SCANNER |
| 0 | 1 | EXTERNAL INPUT |
| 1 | 0 | TEXTURE SYNTHESIS |
| 1 | 1 | WATERMARK SYNTHESIS |

MONO-COLOR EDITING METHOD FOR COLOR PICTURE IMAGE RECORDING

BACKGROUND OF THE INVENTION

The present invention relates to a mono-color editing method for color picture image recording apparatuses, such as color copying machines, color facsimiles, and color printers, and more particularly to a mono-color editing method for a color picture image recording apparatus having the function of color editing process.

Digital color copying machines are provided with a picture image reading means for reading an original sheet by scanning it, a picture image editing means for processing and editing the picture image data thus read, a picture image output means for recording the picture image data processed and edited, and a control means, which controls the picture image reading means, the picture image editing means, and the picture image output means, and are capable of executing various editing processes on the picture image data with the picture image editing means. Further, digital color copying machines have come to employ highly advanced digital color picture image processing techniques in the recent years, so that such machines have realized a large number of color picture image editing functions.

A mono-color converting process is available as one of picture image editing processes for converting an achromatic picture image into a chromatic picture image while maintaining its tonal gradation intact. However, the conventional color picture image recording apparatus performs a color picture image editing process at the stage at which the picture image data are in the form of a picture image in the three primary colors, namely, blue (B), green (G), and red (R), or at the stage at which the picture image has been converted into picture image data in the four toner colors, namely, yellow (Y), magenta (M), cyan (C), and black (K). Therefore, it has hitherto been necessary to perform very complicated processing operations for the execution of mono- color conversion, namely, the processing operations necessary for converting the hue while maintaining the tonal gradation intact and it has also been necessary to take a long period of time for such processing operations.

Hence, for the present invention, it is an object to offer a mono-color editing method which enables a color picture image recording apparatus in a simple construction to execute the mono-color converting process with ease, thereby overcoming the above-mentioned disadvantages of the conventional method.

The mono-color converting process is an editing process which changes only the color in a state in which the tonal gradation of an achromatic picture image is kept intact. Thus, it is considered that the process can be executed with ease, for example, by converting picture image data in the three primary colors, B, G, and R into picture data representing the luminance, hue, and chroma, which are expressed by V, H, and C, respectively, and then converting only the hue into that of a designated color. However, as an achromatic picture image has such a low chroma that a conversion of only the chroma would still result in nothing other than a picture image quite similar to an achromatic picture image.

Therefore, the present invention proposes a method which consists in generating picture image data in the four toner colors by multiplying the luminance signal V with a coefficient for realizing a specified mono-color in response to instructions for the execution of the mono-color converting process.

A color picture image recording apparatus for practicing the mono-color editing method according to the present invention is provided with a matrix means 1 and a multiplying means 2, as illustrated in FIG. 1A. It is to be noted that those editing operations other than the mono-color editing operation, such as color conversion and coloration (painting), are executed at a stage preceding the matrix means 1. A luminance signal L* and two color difference signals a* and b* for a uniform color space are fed into the matrix means 1. Then, the matrix means 1 puts out only the luminance signal L* out of the input picture image data in case the control signal has given instructions for performing a mono-color editing operation, but put outs the toner color signals, which respectively express the toner colors, Y, M, C, and K, out of the above- mentioned signals L*, a*, and b*, in case the control signal instructs otherwise.

The multiplying means 2 multiplies the picture image data put out of the matrix means 1 with a prescribed coefficient. The multiplying means 2 multiplies the picture image data with a coefficient for permitting the toner color signals, which are thus put out of the matrix means 1, to pass through in case the control signal does not give any instruction for the execution of any mono-color editing operation, but generates the four toner color signals for Y, M, C, and K by multiplying the input luminance signal L* with four coefficients respectively corresponding to the color as instructed by the control signal in case the control signal has given instructions for a color editing operation.

Various forms are conceivable for the forms of the coefficients with which the multiplying means 2 multiplies the input picture image data, but the form of such coefficients to be used by the method according to the present invention will be in the form of data expressing the coverage of the toner colors, Y, M, C, and K, namely, the number of dots to be developed per unit area.

Moreover, it is to be arbitrarily determined how many of mono-colors should be made available. For example, in case a converting process is set up for using fifteen mono-colors, it will be sufficient to distinguish sixteen different states including the through state, and the control signal will then be in four bits.

Further, the available methods in which such a coefficient is to be set in the multiplying means 2 include the following. One is a method consisting in setting such a coefficient by a CPU which performs overall control over the picture image processing operations including the mono-color converting process. In this case, the CPU mentioned above recognizes the mono-color which the user has sets and gives a coefficient for realizing the particular mono-color in the form of a control signal at each time to the multiplying means 2. Another method is a method, as shown in FIG. 1B, consisting in providing the multiplying means 2 with a table which contain the coefficients $k_{Yi}$, $k_{Mi}$, $k_{Ci}$, and $k_{Ki}$ (wherein i=0, 1, 2, . . ., . . ., n) written thereto in respect of the individual monocolors registered as such and issuing a control signal indicating the mono-color for which a coefficient is to be used. In this case, the multiplying means 2 sets the coefficient for the mono-color thus indicated by the control signal, reads it out of the above-mentioned table.

Next, the operations for the output from the multiplying means 2 are as described below. In case an image output means arranged at a stage in the downstream side of the multiplying means 2 develops four toner colors in a single developing process, the image output means will be constructed in such a manner that it puts out picture image data on the four toner colors, Y, M, C, and K, at the same time, but, in case an image output means develops toner in one color by one developing process, thus finishing the picture images in full color in four cycles of its developing process, the multiplying means 2 will be constructed in such a manner as to put out the picture image data in a toner color appropriate for each developing process performed by the picture image output means.

Next, a description will be made of the control signal. The control signal is generated for every area for which the mono-color editing process is set up. For example, as shown in FIG. 1C, it is assumed here that a rectangular area 4 and a free-shape area 5 are set up on the original sheet 3, a red mono-color being specified for the area 4 and a green mono-color being specified for the area 5. Then, in respect of the area 4, a control signal indicating the red mono-color will be notified to the multiplying means 2 in synchronization with the picture image data read from the original sheet 3. That is to say, a coefficient indicating the red mono-color is put into the multiplying means 2 at the same time as the picture image data L* for the area 4 are put into the multiplying means 2. Thus, the coefficient for the red mono-color will be set in the multiplying means 2, by which the achromatic picture image in the area 4 will be converted into a red color picture image having the same tonal gradation. In the same manner, a control signal indicating a green color will be notified for the area 5, and also a control signal indicating "through" passage will be notified in any part of the original sheet other than the areas 4 and 5.

The control signals may be generated on the basis of a picture image recording job mode which the user has set. In other words, the user will set the menu to the effect that a mono-color editing process should be performed and also sets the color of the mono-color, thereby indicating what color the mono-color should be, in case an achromatic image in a desired area is to be converted into a chromatic image, a control signal can be generated on the basis of the setting of the picture image recording job mode which the user has thus set.

Moreover, as shown in FIG. 1D, the control signals may also be generated by once producing picture image data having luminance V, hue H, and chroma C from picture image data in the three primary colors, B, G, and R, then detecting with an window comparator 6 whether or not the V, the H, and the C are in their respective predetermined ranges, generating an achromatic color signal, which indicates that the particular pixel is achromatic, in case all of the V, the H, and the C are in their respective predetermined ranges at the same time, and then generating a control signal on the basis of the achromatic color signal.

BRIEF DESCRIPTION OF THE DRAWINGS

The manner by which the above objects and other objects, features and advantages of the present invention are attained will be fully evident from the following detailed description when it is considered in light of the drawings, wherein:

FIGS. 1A to 1D present a set of charts illustrating the construction of an apparatus for use in practicing the mono-color editing method according to the present invention;

FIG. 8 presents a table illustrating an example of the construction of a logic table;

FIG. 10 presents a table for illustrating a description of the TSEL data;

FIG. 11 presents a table for illustrating a description of the MUL data;

FIG. 12 presents a table for illustrating a description of the CCSEL data;

FIG. 13 presents a table for illustrating a description of the NEG data;

FIGS. 14A and 14B present charts for illustrating the negative- positive reversing process;

FIG. 15 presents a table for illustrating a description of the TYPE data;

FIG. 16 presents a table for illustrating a description of the FUL data and the MON data;

DETAILED DESCRIPTION OF PREFERRED EMBODIMENTS

Now, an example of preferred embodiment of the mono-color editing method according to the present invention will be described with reference to the accompanying drawings. It is to be noted in this regard that, although the following example of preferred embodiment is described with respect to a case in which the mono-color editing method is applied to a color copying machine, the present invention is not limited to the form of its application described in the example, but can of course be applied to a color printer or the like.

Figure 2:
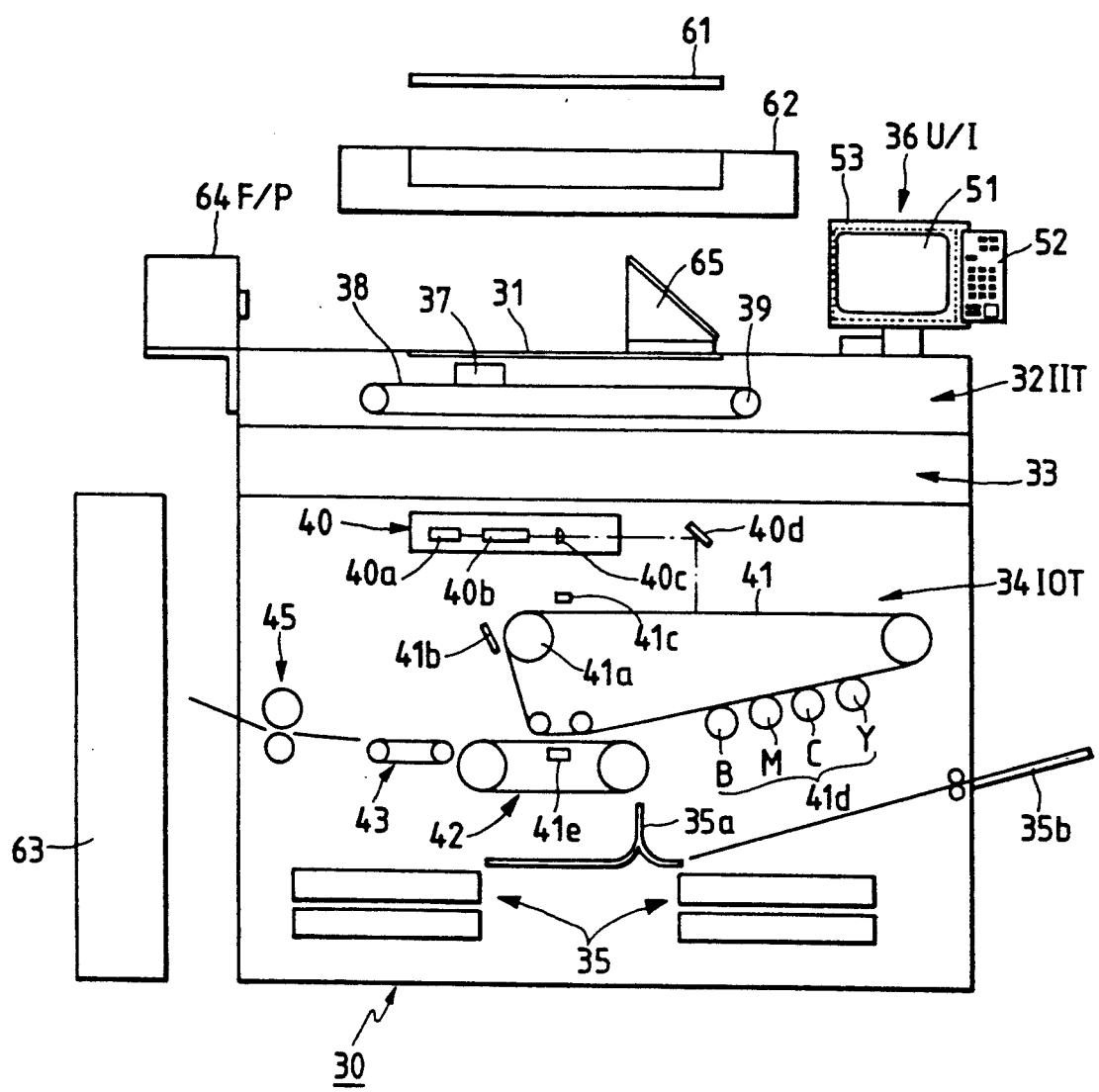
FIG. 2 presents a chart illustrating the construction of the outline of a color copying machine to which the present invention has been applied.

FIG. 2 is a chart illustrating an outline of the construction of a color copying machine to which the present invention has been applied. In FIG. 2, the base machine 30 is comprised of a platen glass 31, on which an original sheet is to be placed, an image input terminal (IIT) 32, an electrical system control unit housing block 33, an image output terminal (IOT) 34, a paper tray 35, and a user interface (U/I) 36, and additionally a film picture image reading unit which, being attached as an optional item to the base machine, is comprised of an editing pad 61, an automatic document feeder (ADF) 62, a sorter 63, a film projector (F/P) 64, and a mirror unit (M/U) 65.

The IIT 32, which is comprised of an imaging unit (I/U) 37, a wire 38 for driving the imaging unit 37, a driving pulley 39, and so forth, reads the picture image information from on an original sheet in color by means of a CCD line sensor, subjecting the picture image information to a color decomposition into the three primary colors, blue (B), green (G), and red (R) of light by means of color filters set inside the I/U 37, converts the picture image information thus read into digital picture image data B, G, and R in multiple tonal gradation, and puts out the converted digital picture image data to an image processing system (IPS).

The IPS, which is accommodated in the electrical system control unit housing block 33, performs various processing operations, such as various types of conversions, correcting processes, and editing processes, in order to enhance the colors, chromatic gradations, fineness, and other picture qualities, as well as features of reproduction, of picture image data in B, G, and R which it receives as input, then converts the picture image data into the primary colors of the toner, namely, yellow (Y), magenta (M), cyan (C), and black (K), converts the toner signals representing the tonal gradation of the process colors into toner signals expressing the binary values for ON and OFF, respectively, and puts out the converted signals to the IOT 34.

The IOT 34, which is provided with a scanner 40 and a photosensitive material belt 41, converts the picture image data into optical signals in the laser output block 40a, forms a latent image corresponding to the picture image of the original sheet on the photosensitive material, belt 41 by way of a polygon mirror 40b, a lens 40c with F/θ, and a reflecting mirror 40d, transfers the picture image onto the paper as transported from the paper tray 35, and discharges a color copy from the machine. In the IOT 34, the photosensitive material belt 41 is driven with a driving pulley 41a, and a cleaner 41b, a charging unit 41c, developing units 41d for the individual toner colors, Y, M, C, and K, and a transfer device 41e are arranged in the area around the photosensitive material belt 41, and a transfer unit 42 is installed in such a manner as to confront this transfer device 41e. Then, the IOT 34 takes up a sheet of paper as it comes transported from the paper tray 35 via the paper transport channel 35a, transfers the respective latent images for Y, M, C, and K onto the paper, rotating the transfer unit 42 four turns in the case of a full color copying operation in four colors, transports the paper from the transfer unit 42 via the vacuum transport unit 43 to the fixing unit 45, where the transferred images are fixed on the paper, and thereafter discharges the paper. A single sheet inserter (SSI) 35b enables the operator selectively to feed a sheet of paper by manual operation into the paper transport channel 35a.

The U/I 36 enables the user to select a desired function and to give instructions on the conditions for the execution of the selected function, and this U/I 36, which is provided with a color CRT display unit 51 and a hard control panel 52, permits the user to give instructions directly by operations on the soft buttons on the screen when it is used in combination with an infrared ray touch board 53. Therefore, the user sets a menu for a mono-color editing job and the color for the mono-color process by means of the U/I 36 when he desires to perform a mono-color editing process. The area on which a mono-color editing job is to be performed is specified 5 either by an input operation on the editing pad 61 or by drawing a closed loop with a marking pen in a predetermined color in a desired area on the original sheet.

The electrical system control unit housing block 33 accommodates a plural number of control boards constructed separately for the individual processing units, such as the IIT 32, the IOT 34, the U/I 36, the ISP, and the F/P 64, and additionally the circuit boards which are used to control the operations of such mechanisms as the IOT 34, the ADF 62, and the sorter 63, and the circuit board which controls the entire system of these boards.

Figure 3:
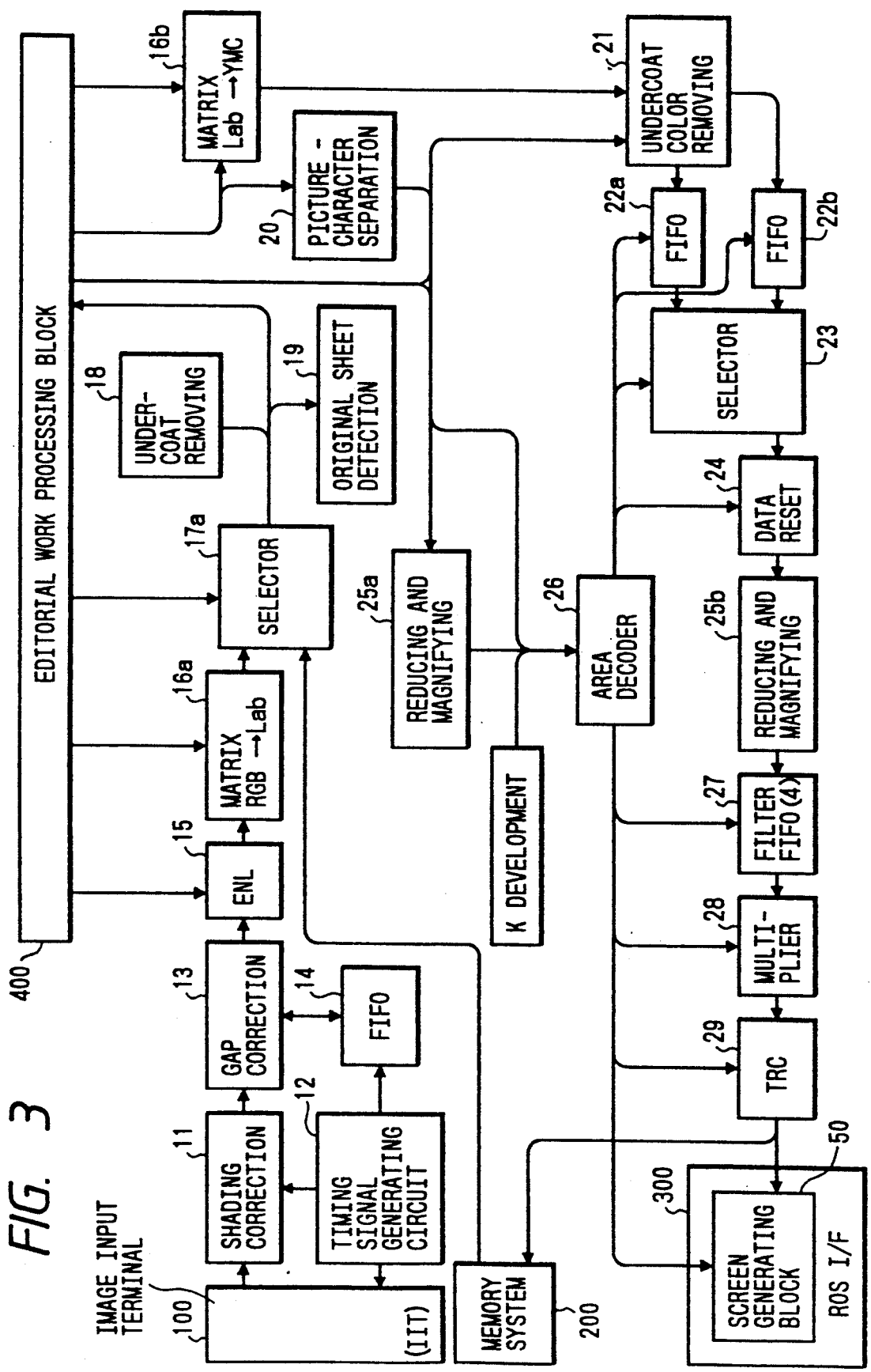
FIG. 3 presents a diagram illustrating an example of the construction of a signal processing system incorporated in the color copying machine shown in FIG. 2.

FIG. 3 presents a diagram illustrating an example of the construction of a signal processing system incorporated in the color copying machine shown in FIG. 2. In FIG. 3, the image input terminal (IIT) 100 is provided with a reduced size type sensor comprised of three CCD line sensors for B, G, and R, respectively, which are arranged, for example, at right angles with the subsidiary scanning direction and performs its reading of picture images, performing a scanning operation in the main scanning direction in synchronization with a timing signal generated from the timing signal generating circuit 12 while moving in the subsidiary scanning direction at such a speed as is in correspondence with the reducing or magnifying ratio. The picture image data for B, G, and R which have been read in this manner are formed into digital picture image data in a predetermined number of bits, for example, eight bits and then given shading correction in a shading correction circuit 11 for compensating for the variances developed among the individual pixels under the influence of various factors, and are thereafter processed in a gap correcting circuit 13 for a correction of gaps among the individual line sensors. This gap correction is for delaying the read picture image data by an amount corresponding to the gap by means of a FIFO 14, so that the picture image data in B, G, and R in the same position can be obtained at the same point in time.

The equivalent neutral lightness (ENL) unit 15 is intended for achieving a gray balance, and this ENL unit 15 is provided with a plural number of LUTs to which the degrees of output density equivalent to the degrees of input density are written for each of the primary color signals for B, G, and R. It is determined by a NEGA signal or a TYPE signal notified from an editorial work processing block 400 which LUT is to be used out of the plural number of LUTs.

The picture image data in B, G, and R as processed for a gray balance by the ENL unit 15 are converted by a matrix circuit 16a into a luminance signal L*, a first color difference signal a*, and a second color difference signal b* for a uniform chromatic space. Further, the coefficients for such a conversion of the picture image data in B, G, and R into L*, a*, and b* by the above-mentioned matrix 16a are changed in accordance with a TYPE signal which is notified from the editorial work processing block 400.

A selector 17, being controlled by an ESS signal notified from the editorial work processing block 400, selectively takes out the output from the matrix circuit 16a or picture image data from a memory system 200, which is an external memory, or performs a process for synthesizing the output from the matrix circuit 16a with the picture image data from the memory system 200. Also, the selector 17 compares the density of each pixel in the input picture image data with a threshold value set in advance and notifies a TEX signal (in one bit) to the editorial work processing block 400 in case the density of the pixel is in any excess of the threshold value.

An undercoat removing circuit 18 operates, for example, for detecting the density of the undercoat by making a histogram for the density of the original sheet in the prescanning operation and sets the density at zero for any pixel in any density below the density of the undercoat, thereby making improvements on the quality of the copy as compared with the original sheet. An original sheet detecting circuit 19 detects the size of the original sheet by finding its circumscribed rectangle through detection of the boundary between the back surface of a platen, which is in black, and the original sheet and then stores the detected size of the original sheet in memory.

The picture image data fed from the selector 17 into the editorial work processing block 400 and subjected to color editing are put into the matrix circuit 16$b$. The matrix circuit 16$b$ lets L* pass through in case a control signal which gives instructions for performing a monocolor editing process is notified to it from the editorial work processing block 400, but converts L*, a*, and b* into the toner colors, Y, M, and C and puts out the converted color data in any other case.

An undercoat color removing circuit 21 performs the following operations on the basis of a control signal notified from the editorial work processing block 400. Specifically, in case the editorial work processing block 400 has given the undercoat color removing circuit 21 a control signal which indicates that a character mode is set, the undercoat color removing circuit 21 puts out L*, which is fed from the matrix 16$b$, to the First In First Out Memory (FIFO) 22$b$, but, in any other case, forms a K-version, as well as new Y, M, and C, from the Y, M, and C received from the matrix 16$b$ and puts out the picture image data in the process color to the FIFO 22$a$. Further, in case a control signal which gives instructions for performing a mono-color editing process has been received from the editorial work processing block 400, the undercoat color removing circuit 21 puts out the luminance signal L*, which is fed into it from the matrix 16$b$, to the FIFO 22$b$.

The picture image data which have been processed for color editing by the editorial work processing block 400 are fed into a picture-character separating circuit 20, which distinguishes characters in color, characters in black, and picture patterns on the basis of differences in their space frequency components.

The area decoder 26 decodes the control signal notified to it from the editorial work processing block 400, the output signal fed into it from the picture-character separating circuit 20, and the output signal fed into it from the reducing and magnifying circuit 25$a$ and distributes the decoded signals to the FIFO 22$a$, the selector 23, the data resetting circuit 24, the filter 27, the multiplier 28, the TRC 29, and the screen generating block 50.

The FIFO 22$a$ and FIFO 22$b$ control the number of delay line by a control signal from the area decoder 26.

The selector 23 furnishes its output to either one of the FIFO 22$a$ and the FIFO 22$b$ as selected in accordance with a control signal notified to it from the area decoder 26. In case the picture image data L* for the area in which the monocolor editing process is set has been fed into it, the selector 23 selects the FIFO 22$b$ by its operation based on a control signal generated from the area decoder 26.

The data resetting circuit 24 determines on the basis of a control signal fed into it from the area decoder 26 whether the picture image data fed into it in accordance with the process color are effective or ineffective. For example, in case a job for copying only the black characters on an original sheet has been selected, the picture image data should be furnished to the IOT 300 only at the time of a processing job for K. Therefore, it is only at the time of a processing job for K that the area decoder 26 generates a control signal to the effect that the picture image data are effective, and the data resetting circuit 24 thereby permits the character data, which are fed into it from the selector 23, to pass through as being effective, but puts out data in zero density, treating the picture image data fed into it at the time of any processing job for any other color, Y, M, or C as being ineffective. Owing to these operations performed in this manner, it is possible to produce picture images in black characters free from turbidity.

The reducing and magnifying circuit 25$a$ performs a reduction or a magnification of an editing command lest the areas in which the area control information for the picture image data are executed should deviate even in case a reduction or a magnification is made of the picture image data, and the reducing and magnifying circuit 25$a$ furnishes area control information reduced or magnified as necessary, which is then decoded by the area decoder 24 and offered for use in the processing of picture image data in various parts. The reduction and magnification of editing commands in the reducing and magnifying circuit 25$a$ mentioned above are performed by reducing or magnifying the area for the editing commands having the same value in the main scanning direction. Thus, the reducing and magnifying circuit 25$a$ performs simple reduction and magnification and is therefore capable of making a reduction or a magnification for any editing command without performing any complicated control.

The reducing and magnifying circuit 25$b$ reduces or magnifies picture image data in the main scanning direction by an interpolation between two points applied to picture image data, which are signals representing multiple values. In addition, the reducing and magnifying circuit 25$b$ is arranged at the downstream of the color editing process, and the picture image data fed into the circuit are therefore only one of the picture image data in Y, M, C, or K in correspondence with the process color. Accordingly, only one system of the above-mentioned reducing and magnifying circuit is sufficient, which ensures that the circuit can be constructed at a low cost.

The filter 27 is a space filter which is designed in such a manner as to be capable of setting various filtering characteristics by the setting of coefficients, and the coefficients are set in accordance with a control signal which is notified from the area decoder 26. For example, in case the character mode is set, a coefficient will be set, in accordance with a control signal, for making the high pass filter characteristics operative, and the edges of characters are thereby emphasized. However, in case the photographic mode or the like is set, a coefficient will then be set for making the low pass filter characteristics operative.

The multiplier 26 is provided with a table which contains the coefficients written to it for each of Y, M, C, and K for multiplications of the picture image data L* therewith in respect of through passage and mono-colors in fifteen colors determined in advance, as shown in FIG. 1B, and the multiplier 26 performs a multiplying operation on the picture image data for each process color, reading the table to obtain the coefficient for the mono-color indicated by the control signal from the area decoder 26. That is to say, the matrix 16b puts out a luminance signal L* as mentioned above in case a mono- color operation is set, and this luminance signal L* is fed into the multiplier 28 via the undercoat color removing circuit 21, the FIFO 22b, the selectors 23 leading to the filter 27. Now, let us assume here that a job for putting out the green mono-color is set up and further that a coefficient of 100% is written for both Y and C and a coefficient of 0% is written for both M and K for the green mono-color to the table mentioned above. Then, the multiplier 28 lets the L* fed into it pass through at the time of its processing of Y and C, while it sets the picture image data at zero at the time of its processing of M and K. The copying machine is thereby enabled to copy the luminance signal L* in green color free from turbidity. In this regard, the above-mentioned coefficients are written in the form of data for the coverage of Y, M, C, and K.

The TRC 29, which works for making adjustments of density in a manner suitable to the characteristics of the IOT 300, is comprised of LUTs to which the output density for the input density is written. Moreover, the LUT to be used is changed over for each process in accordance with a control signal fed from the area decoder 26. Also, the control over the changeover of the output, i.e. the control for determining whether the output should be directed to the memory system 200 or to the IOT 300, is performed with a control signal fed from the area decoder 26.

The screen generating block 50 generates images in mesh points from the picture image data having a density value.

Figure 4:
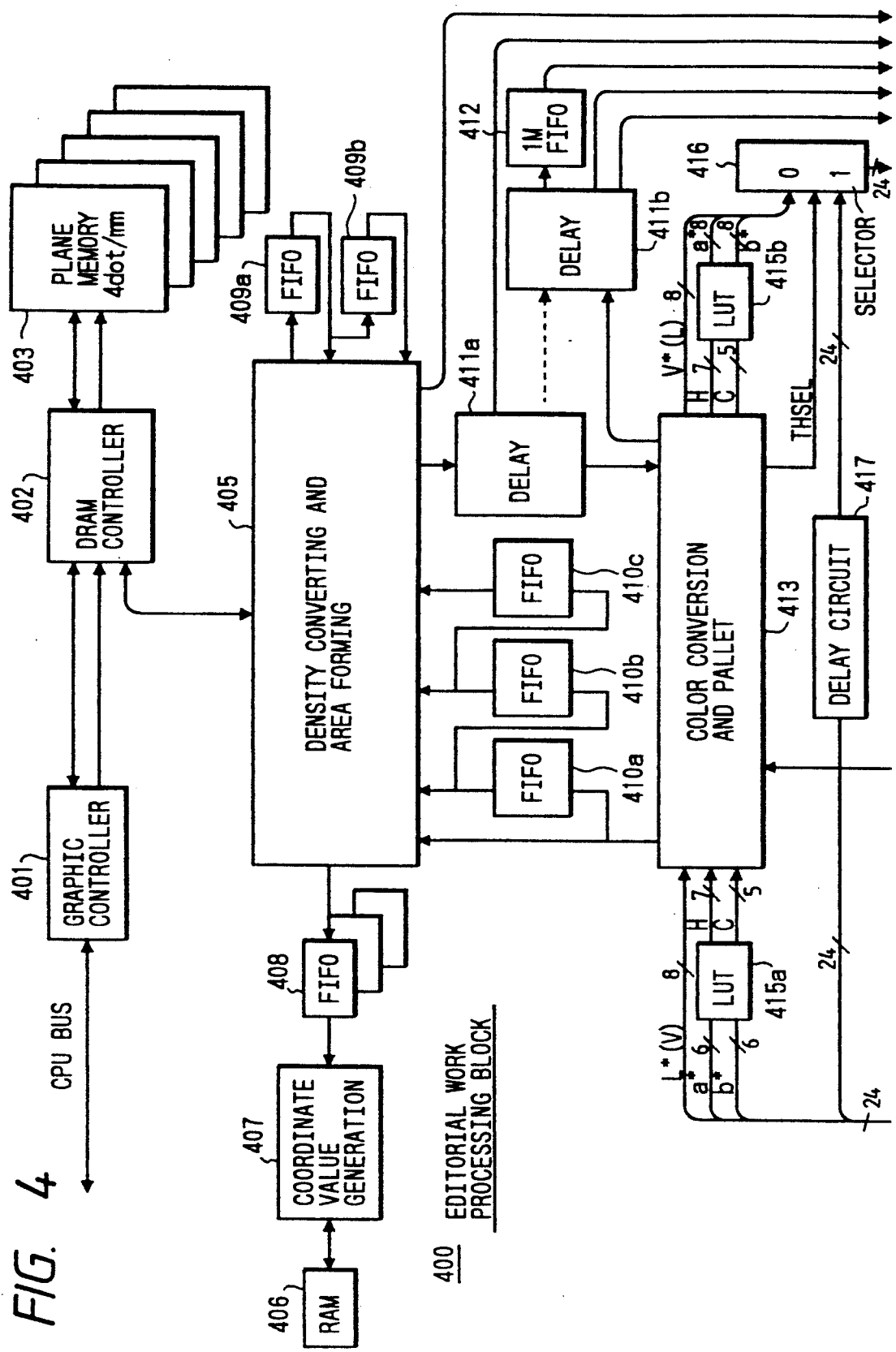
FIG. 4 presents a diagram illustrating an example of the construction of an editorial processing block.

The editorial work processing block 400 performs such operations as color conversion and color editing, as well as the formation of an area, and an example of its construction is shown in FIG. 4.

The picture image data, L*, a*, and b*, each composed of eight bits adding up to a total of 24 bits, which are put out from the selector 17, are fed into the selector 416 with a delay by the delaying circuit 417 by the duration of the processing time for color editing in the color conversion and pallet circuit 413 (which will be referred to simply as the color converting circuit in the subsequent part). Also, the L* is applied as it is to the color converting circuit 413 for its use as a luminance signal V, but, with respect to the a* and the b*, only their six more significant bits are used as the input address for the LUT 415a, and a hue signal in seven bits and a chroma signal C in five bits are put out. This operation is done in order to make it possible to perform such color editing operations as color conversion and coloring with ease.

The color converting circuit 413 performs various color editing operations as those described later on the picture image data L*, H, and C on the basis of the editing commands fed into it from the density converting and area forming circuit 405 (which will be referred to simply as the density converting circuit in the subsequent part) through the delaying circuit 411a. Then, out of the picture image data on which a color editing operation has been done, the luminance signal V in eight bits are fed as it is into the selector 416, but the hue signal H in seven bits and the chroma signal C in five bits are put into the LUT 415b, in which these signals are respectively converted into a first color difference signal a* in eight bits and a second color difference signal b* in eight bits. However, the LUT 415b does not convert the hue signal H and the chroma signal C directly into the first color difference signal a* in eight bits and the second color difference signal b* in eight bits, respectively, but the LUT 415b puts out the signal a* and the signal b* in six bits, respectively, and these signals are formed into data in eight bits with the addition of [00] to fill the two least significant bits. With this operation, the LUT 415a and the LUT 415b can be made equal in their capacity and identical in their construction.

The selector 416 is furnished with the THSEL signal from the color converting circuit 413, and it is determined with the THSEL signal which of the output from the LUT 514b or the output from the delaying circuit 417 should be selected for its output. A description will be made of this THSEL signal later on. Then, the output from the selector 416 is transmitted to the matrix circuit 16b shown in FIG. 3.

Figure 5:
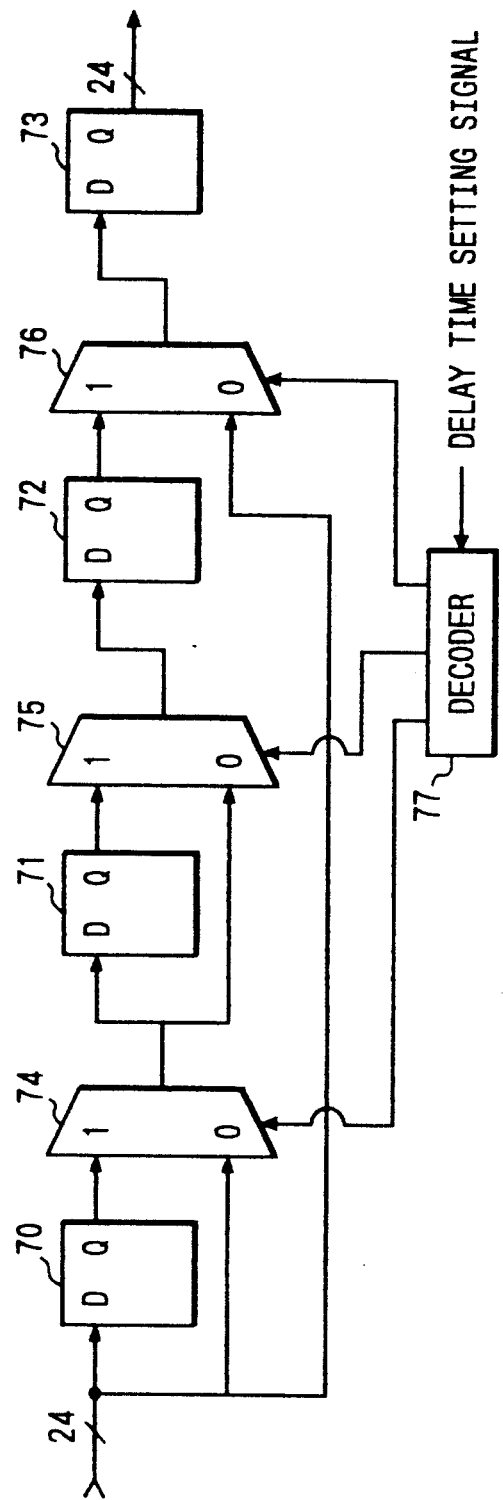
FIG. 5 presents a diagram illustrating an example of the construction of a delaying circuit.

Here, the delaying circuit 417 is constructed, for example, with a variable delaying circuit as the one shown in FIG. 5. In FIG. 5, the reference numbers 70 through 73 designate D-type F/F used as the delaying elements, the reference numbers 74 through 76 designate the selectors, and the reference number 77 designates a decoder. Upon reception of "1" from the decoder 77, the individual selectors 74 through 76 select and put out the signals fed into them from the F/F, but, upon reception of "0", these selectors select and put out the signals fed into them from the other F/F. Therefore, it is possible to obtain a desired delay time by specifying the signals to be selected by the individual selectors by the effect of the delay time setting signal fed into the decoder 77. This point is important. The reason is that the kinds of the color editing operations to be performed in the color converting circuit 413 are subject to changes in the future, and, in such a case, it will be necessary to change also the delaying time, which is needed in the delaying circuit 417. Furthermore, it is possible that the number of bits to be converted or the converting speed should be changed also with regard to the LUT 415a and the LUT 415b, and it will be necessary also in such a case to change the delaying time for the delaying circuit 417. In such cases as these, it will be possible to take an appropriate measure with a delaying circuit constructed in such a way as to permit a change in the delaying time by a delaying time setting signal, as shown in FIG. 5.

Now, in case color editing is to be performed, it will be necessary for the user to set up an area in which the color editing operation is to be performed. The available methods of setting up such an area include a method consisting of placing an original sheet on the editing pad 61 and indicating a desired position of such an area and a method consisting of drawing a desired closed area on the original sheet with a marking pen in a prescribed color, and, in case a desired color is to be applied to a closed area on an original sheet, the available methods include a method consisting of indicating an arbitrarily selected position in the particular closed area by operations on the editing pad 61 or indicating one point in the closed area with a marking pen. Then, the coordinate data thus specified by operations on the editing pad are transmitted from the CPU, which is not shown in the Figure, to a plane memory 403 by way of a graphic controller 401 and a DRAM controller 402, and the pattern for the set area is written to the plane memory 403. Also, the coordinates for the point specified by operations on the editing pad 61 are written to a RAM 406, being transmitted via the graphic controller 401, the DRAM controller 402, the density converting circuit 405, a FIFO 408, and a coordinate value generating circuit 407.

In this regard, the plane memory 403 is comprised of four plane memories having the pixel density of 100 spi, and, as one bit is allocated to each plane, each area will be expressed with a code consisting of four bits, so that 16 areas can be distinguished. Moreover, the pixel density of the editing pad 61 is set at 100 spi.

The pattern of a closed area drawn in a marker color is read at the time of a prescanning operation and then transmitted from the color converting circuit 413 to the density converting circuit 405, in which the pattern is subjected to a density conversion from 400 spi to 100 spi. On this occasion, the density converting circuit 405 performs a pixel density converting operation by executing an operation for converting the density of the pattern into binary values, indicating "1;" using the FIFOs 410a, 410b, and 410c, in case the pixels having a density greater than predetermined values, out of the 16 pixels are at least equal to a prescribed number in a window measuring 4×4. The area pattern on which a density conversion has been made is written to the plane memory 403 via the DRAM controller 402. Then, codes in four bits each are assigned in regular sequence according to the sequence of their registration to the patterns of the individual areas thus written to the plane memory 403. This code in four bits works also as an area editing command which distinguishes the editing process set for each area and is used as an area command (ACMD), which will be described later.

The above-mentioned pixel density conversion is performed also On the marker dots indicated with a marking pen, and the resulting data are processed by the coordinate value generating circuit 407, which determines the coordinate values for the data and writes the values to the RAM 406. The FIFO 408 detects the size of a dot in a window 9×9 formed by giving a delay by eight lines, thereby ensuring that an error in detection will not occur as the result of a mistake in the recognition of a very small particle of dust, marker loop or the like on the original sheet as a marker dot. Moreover, this marker dot, which is stored also in the plane memory 403, is given a treatment for the prevention of an error in its recognition.

Now, and points the areas and points which have been specified on the editing pad 61 are written as they are to the plane memory 403, but, in contrast to this, the subsidiary scanning speed of the IIT 100 at the time of a copy scanning operation is set at such a speed as is in accordance with the set reducing or magnifying ratio. Therefore, the coordinate value for the ACMD as read out of the plane memory 403 at the point in time when the data on the picture image are put into the color converting circuit 413 is in agreement with the data on the picture image in respect of the main scanning direction, but the coordinate value is different from the position of the data on the picture image in respect of the subsidiary scanning direction. Therefore, the value for the subsidiary scanning direction, out of the coordinate values set by operations on the editing pad 61, is multiplied with the set reducing ratio or magnifying ratio, and the position of the ACMD read out of the plane memory 403 is thereby brought into agreement with the position of the picture image data. This processing operation is performed by the graphic controller 401. Now that the area written to the plane memory 403 is thereby set at such area as corrected in respect of the subsidiary scanning direction in accordance with the reducing or the magnifying ratio, it is made possible to perform an editing operation in the set position, regardless of the value of the reducing or magnifying ratio.

The area editing command (ACMD) generated in four bits and stored in the plane memory 403 is read out at the time of a copy scanning operation in synchronization with the reading of the picture image data and is fed into the density converting circuit 405 via the DRAM controller 402. The density converting circuit 405 reads out the information set on the editing process in each ACMD from an internal table, as described later, on the basis of the ACMD thus put into it and notifies the necessary information to the color converting circuit 413 and to the various circuits shown in FIG. 3. When this ACMD is read out of the plane memory 403 and used for such processing operations as an editing process in the color converting circuit 413 and a changeover of the parameters or the like in the picture image data processing system, it is necessary to convert the density of the data from 100 spi to 400 spi, and this processing operation is performed in the density converting circuit 405. For this purpose, the density converting circuit 405 performs the formation of blocks 3×3, using the FIFO 409a and 409b, and effects a conversion of the density from 100 spi to 400 spi and performs an interpolation of the data so that the closed loop curve and the boundaries of the editing areas or the like may be smoothed thereby. The delaying circuits 411a and 411b, FIFO 412, and so forth are operated to make timing adjustments between the information notified to the various parts and the picture image data.

Figure 6:
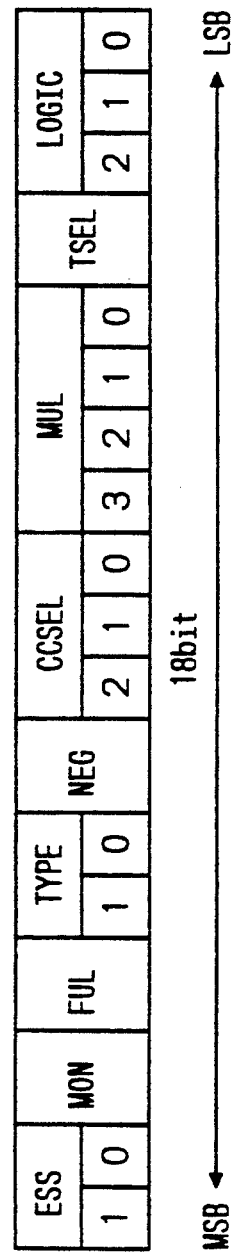
FIG. 6 presents a diagram illustrating an example of the construction of a table with which the density converting and area generating circuit is provided.

Now, when the user performs a copying operation, it is necessary for the user to do various setting jobs, such as the setting of a color mode, i.e. to specify whether the copy is to be taken in full colors or in a mono-color, the setting of the color for the particular mono-color to be used for the output of the copy in case the copying job is to be done in a mono-color, the setting of the picture image data to be copied, namely, whether the picture image data read by the IIT 100 are to be copied, or the picture image data stored in the memory system 200 are to be copied, or those picture image data are to be synthesized, the setting of the type of synthesis, i.e. what synthesis is to be made of those picture image data, the setting of the type of the original sheet, i.e. whether the original sheet to be copied is an original sheet with characters thereon, or an original sheet with a photograph on it, and the setting the mode of copying to specify whether the copying job is to be performed in an ordinary way or for the production of a copy with the negative-positive reversal. The setting of these items are entered by operations on the U/I 36, and the information set by the user for the copying job is written by the CPU to the table in the density converting circuit 405. FIG. 6 is a chart which illustrates the construction of the table, and the individual data, LOGIC, TSEL, MUL, CCSEL, NEG, TYPE, FUL, MON, and ESS, are written in single set areas, respectively. Accordingly, when the ACMDs which are read out of the plane memory 403 in synchronization with the picture image data are fed in regular sequence into the density converting circuit 405, the density converting circuit 405 reads out the information set in the area corresponding to the particular ACMD, using the ACMD fed into it as the input address for the specified table, and notifies the information thus read to the color converting circuit 413 and the other circuits.

Figure 7:
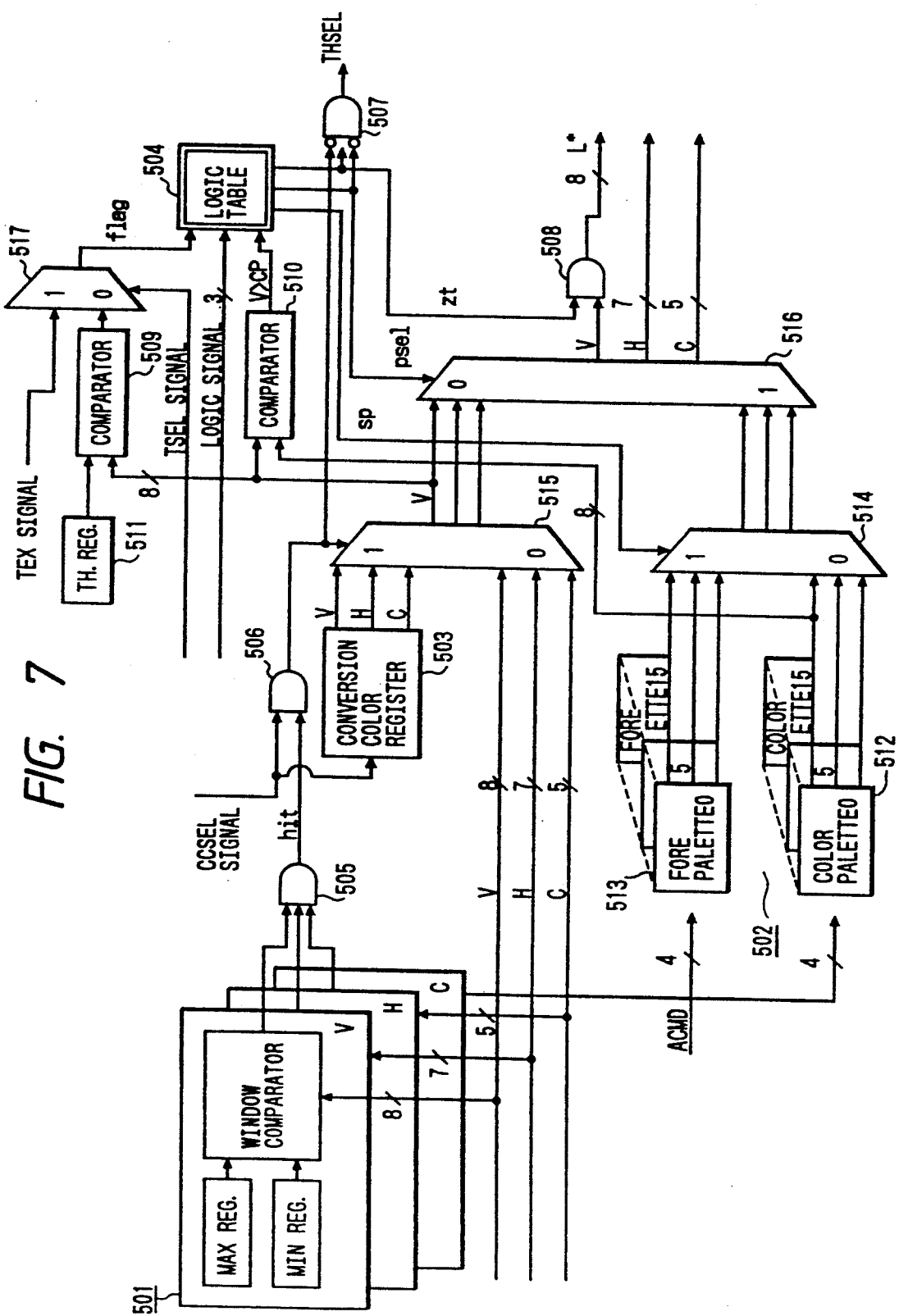
FIG. 7 presents a diagram illustrating an example of the color converting and palette circuit.

Next, a description will be made of the construction of the color converting circuit 413 with reference to FIG. 7, which presents a diagram illustrating an example of the construction of the parts relevant to the present invention in the construction of the color converting circuit 413. In this FIG. 7, the reference number 501 designates a window comparator, the reference number 502 designates a pallet, the reference number 503 designates a converted color register, the reference number 504 designates a logic table, the reference numbers 505 through 508 designate AND gates, the reference numbers 509 and 510 designate comparators, the reference number 511 designates a threshold value setting register, the reference number 512 designates a color palette, the reference number 513 designates a fore-palette, and the reference numbers 514 through 516 designate selectors. In this regard, an AND gate circuit, which is identical with the AND gate circuit 508, is provided, though not shown in FIG. 7, for processing H and C, which are outputs from the selector 516, and control is performed on the AND gate with the signal zt generated from the logic table 504.

The window comparator 501 is a table to which the range of colors to be extracted out of the picture image data, such as the converted colors or the like in color conversion, the respective ranges of the three kinds of marker colors set in advance, and the range of black color for the extraction of only the black color from picture images in black and white are written, and the maximum value and the minimum value for determining the respective ranges of extraction for V, H, and C for each color to be extracted are written to this table. The range of the color of the converted color in the color conversion process is, of course, the range which the user has set by operations on the U/I 36. For example, in case red color is to be extracted in respect of a given area, the range of luminance, the range of hue, and the range of chroma in respect of the red color to be extracted are written to the address, which corresponds to the particular area, in the window comparator 501. Then, the gate circuit 505 puts out a hit signal only in case all of the V, the H, and the C are within the ranges set in the window comparator 501 as determined by the gate circuit 505 when it reads out the range of extraction set in the particular area, using the ACMD as the input address, and compares the range of extraction with the picture image data put into it.

The palette 502, which is to be used in an editing process accompanied with coloration, is provided with two palettes, namely, a color palette 512 and a fore-palette 513. Both the color palette 512 and the fore-palette 513 are composed of tables which define sixteen preset colors in terms of V, H, and C, and the ACMD data will determine of what color the data are to be put out. It is determined on the basis of the contents of a given color editing process whether the color data are to be read out of the color palette 512 or to be read out of the fore-palette 513. In this regard, both the color palette 512 and the fore-palette 513 put out eight bits for the luminance V, seven bits for the hue H, and five bits for the chroma C. By this, it is made possible to construct the palette 502 with a memory in a small capacity.

The converted color register 503 is used in an editing process accompanied with color conversion, and the values of V, H, and C are written in respect of four preset colors, respectively, to this register 503.

The logic table 504 receives a flag FLAG and a LOGIC signal put out from the selector 517, as well as the output from the comparator 510, and puts out a signal sp, which controls the changeover of the selector 514, and a signal psel and a signal zt, which control the changeover of the selector 516. The relationship between the input and output of the logic table 504 is illustrated in FIG. 8. In this regard, the comparator 510 compares the output V from the selector 515 and the output V from the color palette 512 and puts out "1" in case the output V from the selector 515 is the larger of the two. Also, the selector 514 selects and puts out the signal which shows "1" in FIG. 13, namely, the data from the fore-palette 513 in this case, when the signal sp is "1", but selects and puts out the signal which shows "0" in the Figure, namely, the data from the color palette 512 in this case, when the signal sp is "0". The same applies to the selectors 515 and 516.

Next, a description will be made of the flow of data shown in FIG. 6 and the operations of the construction shown in FIG. 7.

Figure 9:
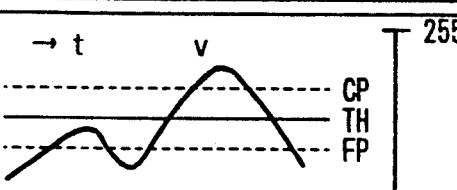
FIG. 9 presents a table illustrating the description of the LOGIC data.
Figure 9:
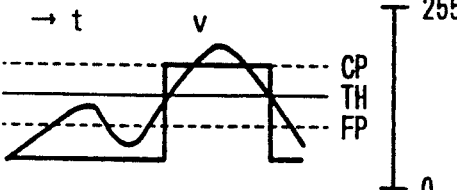
Figure 9:
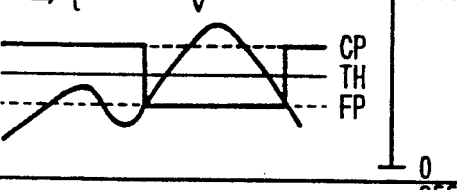
Figure 9:
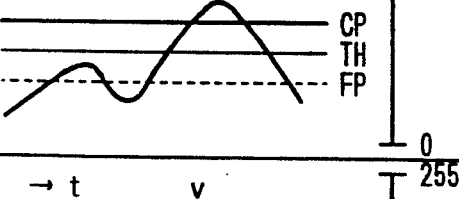
Figure 9:
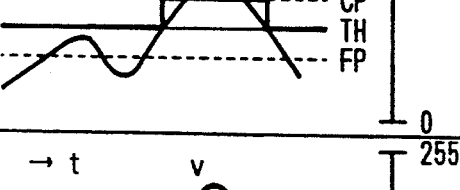
Figure 9:
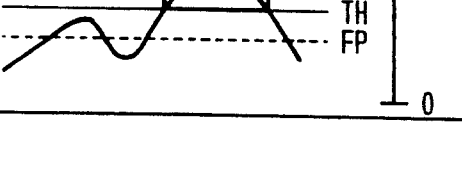

The LOGIC data are the data which specify the type of the editing process (annotation) relating to coloration shown in FIG. 9, and the TSEL data are the data which specify the annotation and specify the synthesis of characters, as shown in FIG. 10.

In the case of an ordinary copy in respect of which annotation is not specified, all the LOGIC data are made "0" and will consequently be psel =0, zt=1, and sp=0, as shown in FIG. 8, and additionally the output from the gate circuit 506 is made "0" at this time. Therefore, V, H, and C pass through the color converting circuit 413, but, as the THSEL signal, which is put out of the gate circuit 507, becomes "1," the selector 416 (FIG. 4) selects and puts out the output from the delaying circuit 417. That is to say, the color converting circuit 413 processes the picture image data, L*, a*, and b*, which are in eight bits each, in the form of picture image data in a total of twenty bits for V, H, and C, and the fidelity of the reproduced picture image as compared with the picture image on the original sheet will be inferior to the picture image data, L*, a*,.and b*, but, as the result of the performance of the operations mentioned above, picture image data, L*, *a, and *b, in eight bits each, are selected for those pixels on which the color editing process is not performed. Hence, it is thereby made possible to obtain a picture image attaining fidelity to the picture image on the original sheet.

In case the coloration of characters has been selected as annotation, TSEL=0 holds valid. Therefore, the selector 517 selects the output from the comparator 509, which means that LOGIC=001, and, since sp=0 as shown in FIG. 8, the selector 514 selects the output from the color palette 512. Then, at this moment, the output from the gate circuit 506 is "0" and the input picture image data, V, H, and C, will pass through the selector 515. However, the comparator 509 compares V with the threshold value TH, and flag=1 will be realized in case the value of V is equal to or in excess of the threshold value, but flag=0 will be realized in case the value of V is less than the threshold value. Then, in the case of flag=1, psel=zt=1 will hold valid. Therefore, the data in the colors, V, H, and C, as prescribed, which are read out of the color palette 512, will be put out. However, in the case of flag=0, psel=zt=0 will hold valid. Therefore, the output from the selector 516 is prohibited in the gate circuit 508, so that the values of V, will be "0". Moreover, THSEL=0 holds valid at this time, and the selector 416 accordingly selects the output from the color converting circuit 413. By this, the character block (foreground; f.g.) in a desired area of the picture image on the original sheet will be rendered in the color set on the color palette 512, while the background area (background; b.g.) excluding the character block can be rendered colorless. That is to say, only the character block can be colored in a desired color.

In case a color relief character has been selected as annotation, psel=zt=1 will hold valid. Therefore, the selector 516 always selects the output from the color palette 502. Also, as TSEL=0 holds valid, the selector 517 selects the output from the comparator 509. At this time, then, the output from the gate circuit 506 is "0" and the input picture image data in V, H, and C will pass through the selector 515, but the comparator 509 compares V with the threshold value TH, and flag=1 will be realized in case the value of V is equal to or in excess of the threshold value, but flag=0 will be realized in case the value of V is less than the threshold value. Moreover, in case flag=1 holds valid, then sp=1 is valid, and the selector 514 will therefore selects the data in the colors V, H, and C as prescribed, which are read out of the fore-palette 513. However, in the case where flag=0, sp=0 is attained, and the selector 514 accordingly selects the data in the colors V, H, and C as prescribed, which are read out of the color palette 512. In this regard, THSEL=0 holds valid at this time, and the selector 416 therefore selects the output from the color converting circuit 413. By this, it is made possible uniformly to paint out the character block and the background area, respectively, in desired colors.

In case "paint" has been selected as annotation, psel =zt=1 and sp=0 hold valid. Hence, the data in the V, H, and C colors as prescribed, which are read out of the color palette, are always put out. Moreover, as THSEL=0 is attained at this time, the selector 416 selects the output from the color converting circuit 413, and it is thereby made possible uniformly to paint out a set area with a desired color.

In case coloration has been selected as annotation, zt =1 and sp=0 hold valid, and the selector 514 selects the output from the color palette 512. Also, as TSEL=0 is attained, the selector 517 selects the output from the comparator 509. At this time, moreover, the output from the gate circuit 506 is "0". Hence, the input picture image data in V, H, and C pass through the selector 515, and the comparator 509 compares V with the threshold value TH, and flag =1 is attained in case the value of V is equal to or in excess of the threshold value while flag=0 is attained in case the value of V is less than the threshold value. Then, as psel=0 holds valid in the case of flag=1, the selector 516 selects the picture image data from the selector 515. Yet, as psel=1 holds valid in the case of flag=0, the selector 516 selects the data in the V, H, and C colors as prescribed, which are read out of the color palette 512. In this regard, THSEL=0 is attained at this time, and the selector 416 therefore selects the output from the color converting circuit 413. By this, it is made possible to paint out only the background area, which excludes the character block, with a desired color.

In case character synthesis has been selected as annotation, zt=1 and sp=0 hold valid. The selector 514 therefore selects the output from the color palette 512. Also, as TSEL=1 (FIG. 15) is attained, the selector 517 selects the TEX signal. The selector 17 (FIG. 3) compares the value of the luminance in the input picture image data with the predetermined threshold value and puts out TEX=1 in case the value of the luminance V is equal to or in excess of the threshold value, but puts out TEX=0 in any other case. Then, the value of the flag in the selector 517 will be "1" when TEX=1 is attained. Then, when flag=1 holds valid, psel=1 is attained, and the selector therefore selects the data in the colors V, H, and C as prescribed, which are read out of the color palette 512. However, when flag=0 holds valid, psel=0 is attained, and the selector 516 therefore selects the picture image data from the selector 515. At this time, moreover, THSEL=0 is attained, and the selector 416 therefore selects the output from the color converting circuit 413. By this, it is made possible to paint out only the character block in a desired color.

The MUL data in FIG. 6 are a signal for specifying a mono-color editing process to be performed on a set area. As shown in FIG. 11, "through" and fifteen monocolors marked from A to O are determined in advance in accordance with the values in four bits. These MUL data are notified from the density converting circuit 405 to the multiplier 28. It goes without saying that a delay is effected as appropriate at such a time in order to match the timing in processing.

At the time of the ordinary copying operation in which the mono-color editing process is not set up, all the bits of the MUL data are set in "0" and a coefficient for letting the input picture image data pass through will therefore be set in the multiplier 28, so that the picture image data will be put out as they are. In case any mono-color editing process in a predetermined color has been selected, the MUL data in a value corresponding to the particular color will be notified to the multiplier 28. By the effect of this operation, the multiplier 28 multiplies the input picture image data L* for each process color with such a coefficient as is determined by the MUL data and puts out the resulting value. For example, it is assumed here that the multiplier coefficient A shown in FIG. 11 designates a monocolor in green, the coefficients thereof being 100% for both Y and C and being 0% for both M and K. Then, in case the MUL data specify A, the multiplier 28 lets the input picture image data pass through it at the time of the processing of Y and C, but renders the picture image data as "0" at the time of the processing of M and K.

Next, a description is made in respect of the CCSEL data. These data are those which determine a conversion color in case color conversion is set in an area set on the original sheet, and, as shown in FIG. 12, "through" and seven kinds of color conversions are made available. As described above, four pairs of conversion data which consist of the source color and the color to be converted, A, B, C, and D, are registered in the converted color register 503, which is constructed in such a way that it is, of course, possible not only to use any of these registered kinds of color conversion independently, but also to specify any arbitrarily selected kinds of color conversion out of a total, of seven kinds of color conversions including a composite color conversion which is composed of A and B, composite color conversion which is composed of A, B, and C and a composite color conversion which is composed of A, B, C, and D. When a composite color conversion is selected, the color conversion is performed according to the predetermined priority order of conversions (A>B>C>D).

In case color conversion is not selected, all the bits of the CCSEL data are "0" and the output from the gate circuit 506 is "0", and, if the LOGIC data were in the through state at this time, psel=0 and zt=1 are attained, and, as the result of this, THSEL=1 holds valid, so that the selector 416 selects the output from the delaying circuit 417.

In case color conversion has been selected, then all the ACMDs are read out of the plane memory 403 in synchronization with the picture image data, and further the CCSEL data which correspond to the individual ACMDs are read out from the density converting circuit 405, and both of these are fed into the color converting circuit 413. Moreover, if the LOGIC data were kept in the through state also in this case, psel=0 and zt=1 hold valid.

The input picture image data in V, H, and C and the range of extraction, which is set in the window comparator 501, are compared in the window comparator 501. Then, in case all of the V, H, and C of the input picture image data are within the range of extraction, the gate circuit 505 generates a hit signal. This hit signal is put into the gate circuit 506, and, in case the hit signal is "1" and the CCSEL data fed from the density converting circuit 405 are not "through" in the above-mentioned gate circuit 506, then the gate circuit 506 puts out "1". By this, the selector 515 selects the output from the conversion color register 503 and puts out the output thus selected, and, at this time, the conversion color register 503 puts out the prescribed data in the colors, V, H, and C, as determined by the CCSEL data. Also, in case the output from the gate circuit 506 is "1", the THSEL signal will be "0", and the data on the conversion color are output from the selector 416, but, in any case other than that, TFSEL=−1 holds valid, so that the selector 416 selects the output from the delaying circuit 417 and puts out the output thus selected.

Next, a description is made of the NEG data. As shown in FIG. 13, the NEG data are the data which indicate in one bit whether the ordinary copying job is to be performed on the set areas on the area-by-area basis or whether the copying job should be executed by a negative-positive reversal, and these data are notified from the density converting circuit 405 to the ENL 15. As mentioned above, the ENL 15 attains a gray balance by means of the LUT as the one shown in FIG. 14A at the time of the ordinary copying operation (NEG=0), but, in case NEG=1 has been notified, the ENL 15 generates and puts out picture image data prepared by a negative-positive reversal by means of an LUT for input-output characteristics as shown in FIG. 14B. In this regard, the THSEL signal, which is an output from the gate circuit 507, will be "1" in case a negative-positive reversal has been set, so that the selector 416 selects the output from the delaying circuit 417.

Next, a description is made of the TYPE data, which, as shown in FIG. 15, are the data for setting the types of the original sheet, namely, whether the area set on the original sheet is a standard picture image, or a character image, or an image like a photograph, or a picture image containing half-tone images in multiple colors and/or fine characters in color as is the case with a map, and the TYPE data will be set at the standard original sheet unless the user specifically sets another type. These data are notified directly from the density converting circuit 405 to the ENL 15, further notified to the matrix 16a via the delaying circuit 411a, and still further notified to the area decoder 26 via the delaying circuits 411a and 411b. The data which have been decoded by the area decoder 26 are notified to the filter 27, the TRC 29, and so forth, and a processing operation appropriate for the instructed type of the original sheet is executed in each of the circuit. For example, the ENL 15 and the TRC 29 selects the LUT most suitable for the instructed type of the original sheet, and the filter 27 performs filtering operations in accordance with the instructed type of the original sheet, and the matrix 16a sets a conversion coefficient in accordance with the instructed type of the original sheet.

Next, a description will be made of the FUL data and the MON data. These types of data are applied in the combination of these two data, as shown in FIG. 16, to giving instructions on the mode of the original sheet in each set area, and these data are notified to, the selector 23, the data resetter 24, the multiplier 28, and so forth via the matrix 16b and the area decoder 26, and the prescribed processing operation is executed. For example, in case a mono-color editing operation has been specified, the matrix 16b permits only L* to pass through it, as described above, and the undercoat color removing circuit 21 similarly puts out L*, the selector 23 is caused to select the FIFO 22b, and the multiplier 28 puts out a value obtained by multiplying the value of L* with a coefficient which is in accordance with the instructed mono-color.

Figures 17, 18:
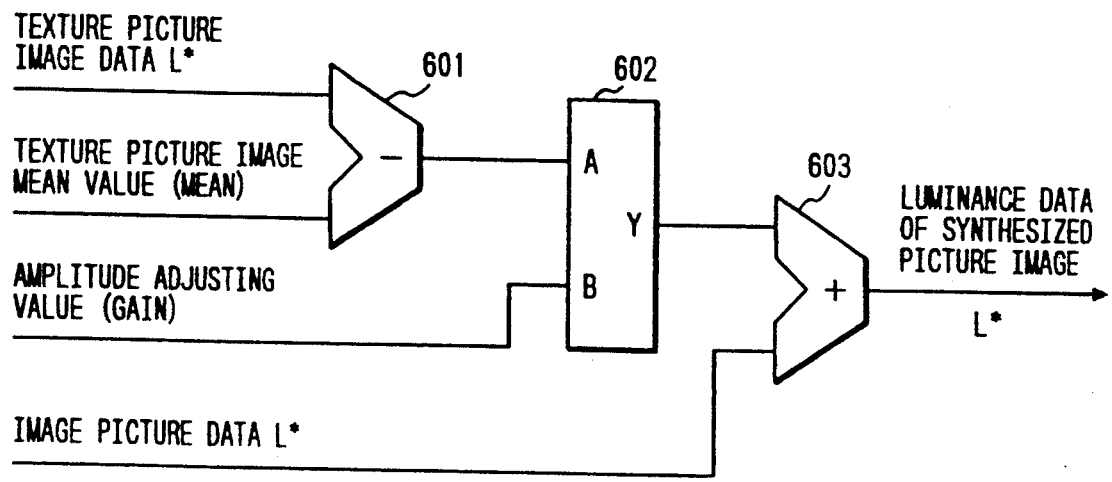
FIG. 17 presents a table for illustrating a description of the ESS data.
FIG. 18 presents a diagram illustrating an example of construction of the texture synthesizing circuit.

Next, a description is given with respect to the ESS data. These data are the data which, as shown in FIG. 17, specify whether the selector 17 should select the picture image data read into it from the IIT 100, or should select the picture image data read out of the memory system 200, or should form a synthesis of these two groups of data, and the ESS data are notified to the selector 17 from the density converting circuit 405 via the delaying circuit 411a. In this regard, the scanner input in FIG. 17 means the selection and output of the picture image data read with the IIT 100, and the external input means the selection and output of the picture image data read out of the memory system 200.

Figure 19A:
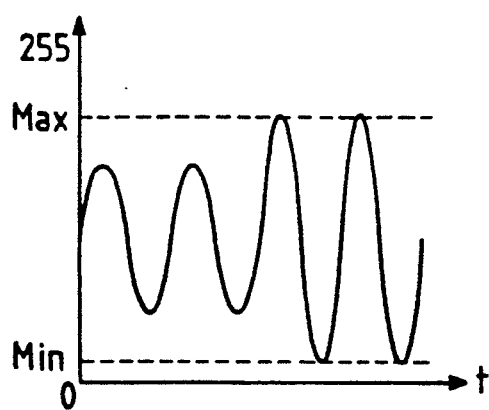
FIGS. 19A to 19C present a set of charts for illustrating a description of the texture synthesis.
Figure 19B:
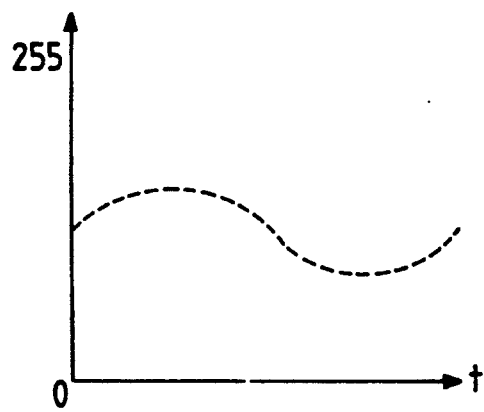
Figure 19C:
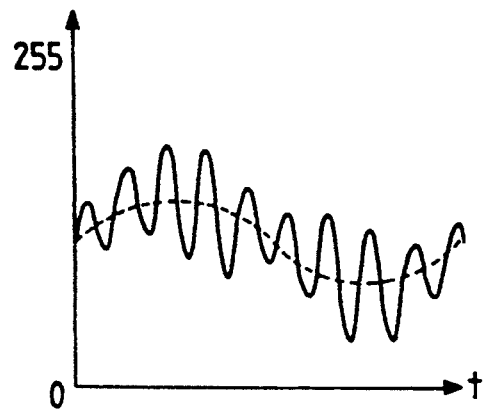

Texture synthesis is as described below. The selector 17 is provided with a synthesizing circuit, which is illustrated in FIG. 18, and, in case instructions have been given for any texture synthesis, the synthesizing circuit is set into operation. The texture picture image which is written to the memory system 200 is read out in synchronization with a scanning operation of the IIT 100, and, at this time, the memory system 200 puts out the luminance data L* of the texture picture image and also puts out a mean value which it obtains from the maximum value and minimum value of the luminance data L* of the same texture picture image. The luminance data L* of the texture picture image and the mean value of the data are fed into a subtracter 601, in which the mean value is subtracted from the luminance data L*. By this operation, the subtracter 601 puts out the data on the alternating current component of the luminance data L* of the texture picture image. The output from the subtracter 601 is added with an amplitude adjusting value in the adder 602, and the output is added up by the adder 603 with the luminance data L* of the imaged picture image read with the IIT 100, and the added value thus obtained is put out as the luminance data L* of the picture image to be formed by the synthesis. In this regard, the amplitude adjusting value is a value which the user has set, and the value is set by the CPU on the adder 602. Moreover, the data a* and data b* of the imaged picture image are used as they are for the data a* and data b* of the synthesized picture image. Therefore, the luminance data of the synthesized picture image produced by the texture synthesis will be as shown in FIG. 19C, provided that the luminance data of the texture picture image written to the memory system 200 are as shown in FIG. 19A and further that the luminance data of the imaged picture image read with the IIT 100 are as shown in FIG. 19B.

Figure 20:
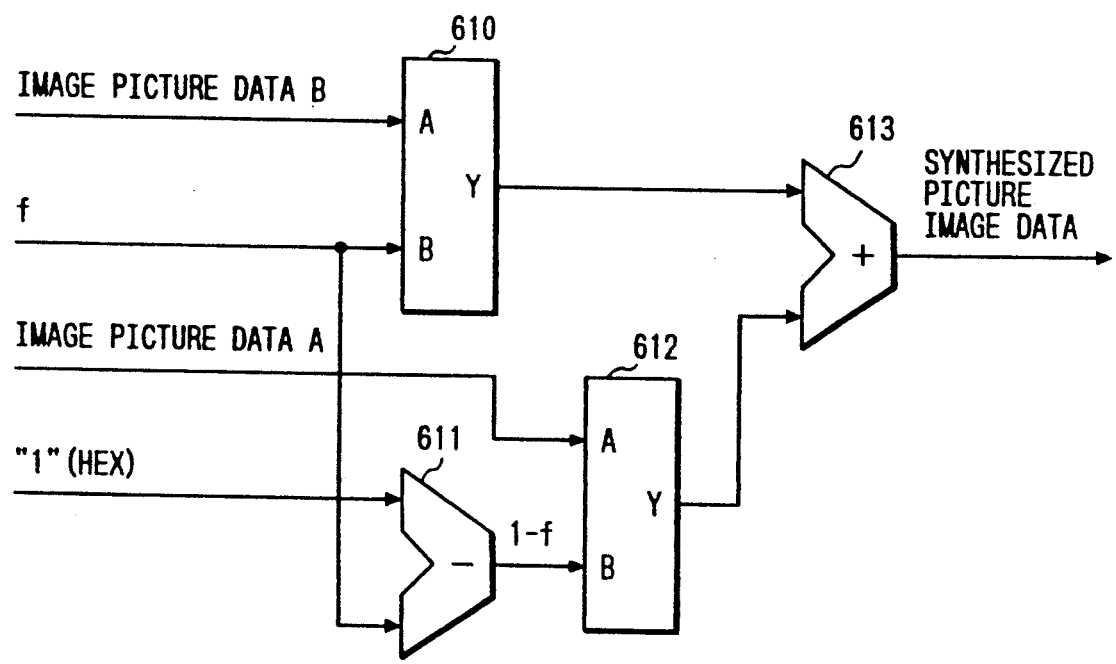
FIG. 20 presents a diagram illustrating an example of the construction of the watermark synthesizing circuit.

Moreover, the watermark synthesis is as described below. The selector 17 is provided with the synthesizing circuit shown in FIG. 20 with respect to each of L*, a*, and b*, and, in case watermark synthesis has been specified, the synthesizing circuit will be put into operation. Now, the picture image data read with the IIT 100 are expressed as the picture image data A and the picture image data read out of the memory system 200 are expressed as the picture image data B. Then, the picture image data B are multiplied with the coefficient f ($0 \leq f \leq 1$) by the multiplier 610, and the picture image data A are multiplied with the value $(1-f)$, which is an output from the subtracter 611, by the multiplier 612. Then, the output from the adder 610 and the output from the multiplier 612 are added up together in the adder 613, and the synthesized picture image data are thereby generated. In this regard, the coefficient f is a value which the user has set, and the value is then set on the multiplier 610 and the subtracter 611 by the CPU.

In the foregoing part, a description has been made of one example of preferred embodiment of the present invention. However, the present invention is not limited to the example of embodiment described above, and it will be evident to those skilled in the art that the present invention can be modified in a variety of ways.

As it is evident from the description given hereinabove, the present invention can make it possible to convert an achromatic picture image into an image in a desired color while keeping its tonal gradation intact. In addition, it is sufficient, for accomplishing this, only to change the coefficient given to the multiplying means, the mono-color converting process according to the present invention is much simpler in comparison with the conventional mono-color converting process. Thus, the present invention can reduce the burden placed on the CPU and can therefore construct an apparatus for its practice at a low cost.

What is claimed is:

1. A mono-color editing method for a color picture image recording apparatus, comprising the steps of:

inputting picture image data composed of a luminance signal, a first color difference signal and a second color difference signal to a matrix means, said matrix means outputting said luminance signal when said matrix means is notified of a control signal giving instructions for a mono-color editing operation for converting an achromatic picture image into a prescribed chromatic picture image while maintaining tonal gradation intact, said matrix means also generating and outputting four toner color signals for yellow, cyan, magenta, and black from said picture image data when said matrix means is not notified of said control signal; and multiplying output picture image data from said matrix means with a prescribed coefficient in a multiplying means.

2. A mono-color editing method as defined in claim 1, wherein said control signal giving instructions for the monocolor editing operation is formed for each area for which a mono-color editing operation has been selected.

3. A mono-color editing method as defined in claim 1, wherein said multiplying means outputs four toner color signals at the same time for the luminance signal input into said matrix means.

4. A mono-color editing method as defined in claim 1, wherein said multiplying means outputs one toner color signal corresponding to a developing color in each developing process for the generating and outputting of the four toner color signals.

5. A mono-color editing method as defined in claim 1, wherein said coefficient with which said output picture image data is multiplied is expressed in terms of coverage of the four toner color signals.

6. A mono-color editing method as defined in claim 1, wherein a coefficient for permitting said input picture image data to pass through is set in said multiplying means in case said control signal giving instructions for the mono-color editing operation is not notified to said matrix means.

7. A mono-color editing method as defined in claim 1, wherein said coefficient is set in said multiplying means at each time.

8. A mono-color editing method as defined in claim 1, wherein said multiplying means is provided with a table to which coefficients for a preset number of mono-colors and a coefficient for permitting the picture image data to pass through are written and sets the coefficient for a color as instructed by said control signal after reading the coefficient out of said table.

9. A mono-color editing method as defined in claim 1, wherein said control signal is formed on the basis of a picture image recording job mode set by a user.

* * * * *

UNITED STATES PATENT AND TRADEMARK OFFICE
CERTIFICATE OF CORRECTION

PATENT NO. : 5,315,416
DATED : May 24, 1994
INVENTOR(S) : Kazuman Taniuchi et al.

It is certified that error appears in the above-indentified patent and that said Letters Patent is hereby corrected as shown below:

Item [54],
TITLE Page, Left Column, Title: After "RECORDING" add --APPARATUS--.

Signed and Sealed this

Third Day of January, 1995

BRUCE LEHMAN

*Attest:*

*Attesting Officer*            Commissioner of Patents and Trademarks